Sept. 13, 1966     A. B. HUSTON     3,272,589
TEMPERATURE SCALE FOR STERILIZER
Filed March 20, 1964
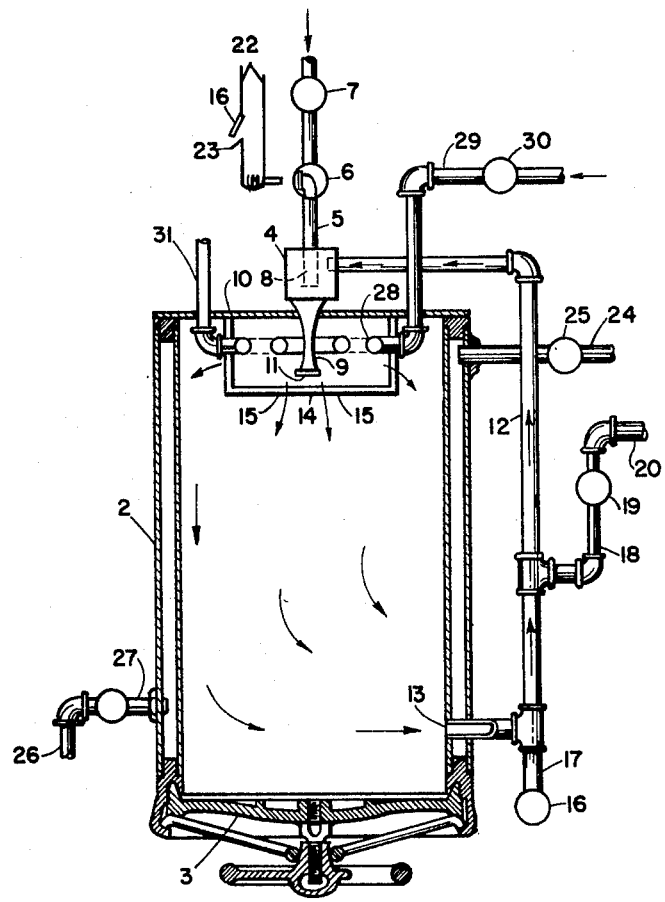
FIG·1
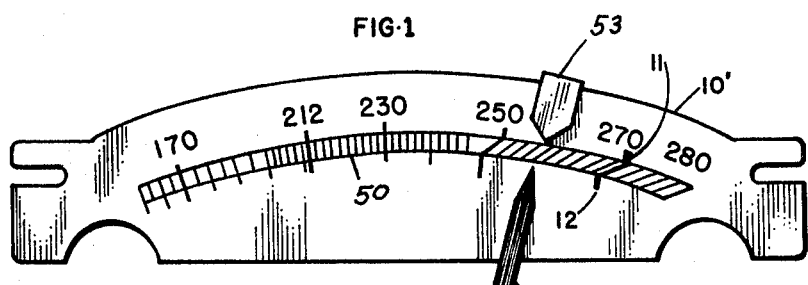
FIG·2
INVENTOR.
*ALFRED HUSTON*
BY
*Charles L. Sovereheek*
*Attorney*

United States Patent Office 3,272,589
Patented Sept. 13, 1966

3,272,589
TEMPERATURE SCALE FOR STERILIZER
Alfred B. Huston, Erie, Pa., assignor to American Sterilizer Company, Erie, Pa., a corporation of Pennsylvania
Filed Mar. 20, 1964, Ser. No. 353,441
1 Claim. (Cl. 21—98)

This invention relates to sterilizers and, more particularly, to sterilizers adapted to carry out a plurality of sterilizing and/or process cycles.

This invention was brought about by accepted practice in the sterilizing industry and processing operations that utilize sterilizers at lower than sterilizing temperatures. Any operation done in a pressure steam sterilizer at a temperature of 250° or higher can be considered sterilization, while any operation done at a temperature lower than 250° in a pressure steam sterilizer is normally considered processing. In many present machines, both processing and sterilization can be done at different times.

It is common practice in the industry that when processing is being done in the lower temperature ranges, the sterilizer controls will be adjusted to hold both the set point and the indicated point in the sterilizing chamber. The accepted practice has also been that when the machine is used as a sterilizer, the controls are adjusted to maintain a particular referred to temperature of, for example, 250°, not in the chamber, but in the load located in the chamber. This means that for sterilizing operations, the controls must maintain a temperature in the chamber three or four degrees higher than that desired in the load in order to have a temperature difference required to heat the load itself to the referred to temperature. In old pressure regulated machines, this was accomplished by adjustments on the pressure regulator. In the processing cycle or sterilizing cycle, the timer which actuated the exposure was actuated at the set point indicated by a movable pointer on an indicating scale. However, on thermostatically controlled machines, the setting of this movable pointer not only controls the actuation of the exposure timer but also controls the temperature at which the sterilizing chamber functions. The setting of this one pointer establishes the point at which the exposure timer is actuated, and with a fixed differential of approximately one degree; also, the temperature at which the chamber controls. Of course, the chamber controls a degree or two above the timer actuating point.

If one will now refer back to the established practice in the processing range and the established practice in the sterilizing range, the difference will be noted that in the processing range, the set point indicator should control the chamber at the point or reference temperature to which it is set, while in the sterilizing range, the setting pointer should control the same chamber at an actual temperature three or four degrees higher than the referred to temperature while the indicating pointer should still indicate the actual temperature in the chamber itself.

In order to accomplish these two varying conditions, an offset scale has been designed. On this scale, the lower edge indicates with the indicating pointer the actual temperature in the chamber throughout the entire range. However, the top edge of the scale is offset from the 250° minimum sterilizing temperature on upward. This offset is 4° F. Thus, in a lower temperature or processing range, when the movable setting pointer is set at a particular number on the scale, the chamber will actually control to that setting or reference number. In the higher temperature ranges or sterilizing range, when the setting or control pointer is set at a particular number or reference number, the chamber will control 4° F. higher than the selected control or reference number, while the load itself will tend to be at the actual selected or reference temperature. Thus, with this offset scale, the user of the machine can follow old, accepted practices in both the processing range and the sterilizing range when utilizing modern thermostatically controlled machines.

It is, accordingly, an object of the invention to provide an improved sterilizer in combination with control means therefor.

Another object of the invention is to provide an improved control means for a sterilizer. A further object of the invention is to provide an improved sterilizer and control means wherein said control means has a scale and an indicating pointer and a control pointer and calibrations on said scale which are perpendicular to the path of movement of said indicating pointer at positions representing temperatures below a predetermined temperature and said calibrations are inclined relative to the path of movement of said pointer at positions representing temperatures above a perdetermined temperature.

With the above and other objects in view, the present invention consists of the combination and arrangement of parts hereinafter more fully described, illustrated in the accompanying drawing and, more particularly, pointed out in the appended claims, it being understood that changes may be made in the form, size, proportions and minor details of construction without departing from the spirit or sacrificing any of the advantages of the invention.

FIG. 1 is a cross-sectional view of a conventional type of sterilizer in which the processes and the sterilizing cycles could be carried out.

FIG. 2 is an enlarged view of a scale for the control means of the sterilizer shown in FIG. 1.

Now with more particular reference to the drawing, the sterilizer shown has a chamber 2, having a door 3. At the back of the sterilizer is an aspirator 4 connected to a high-pressure steam line 5 controlled by a solenoid valve 6 and a manual valve 7. The high-pressure steam line 5 has a discharge nozzle 8 directed into the throat of a venturi nozzle 9 extending through the back wall 10 of the sterilizer chamber and having its inner or discharge end 11 directed toward the front end of the sterilizer chamber. A line 12 leading from a drain 13 at the lower front end of the sterilizer is connected to the aspirator behind the steam jet discharge nozzle 8 so that the jet of steam discharged through the nozzle 8 into the venturi tube 9 induces a flow of air and steam from the lower front part of the sterilizer chamber through the line 12 and into the aspirator. This produces a flow of steam and air from the back toward the front of the sterilizing chamber as indicated by the arrows. In some cases, the load within the chamber may sufficiently distribute the flow of air and steam so that uniform temperatures will be obtained without stratification. In other cases, it may be necessary to arrange a baffle 14 in front of the steam jet with suitable openings 15 so directing the discharge from the front end 11 of the venturi nozzle 9 so as to produce the desired circulatory flow within the sterilizing chamber. The high-pressure steam jet discharged through the venturi nozzle 9 produces a suction which draws the mixture of air and steam vapor from the lower front part of the chamber through the drain opening 13 and back to the aspirator 4 through the line 12. This produces the desired circulation which is necessary to maintain uniform temperature throughout the sterilizing chamber without stratification.

The temperature within the sterilizing chamber is controlled by a thermostat 16 arranged in a fitting 17 leading from the line 12 adjacent the drain 13. A drain line 18 leading from the lower part of the line 12 through a check valve 19 conducts condensate to a suitable drain 20. The check valve serves as a restriction limiting back-flow of air from the drain when the aspirator produces a suction in line 12.

The thermostat 16 can be controlled by means of a suitable indicating control instrument of the type familiar to those in the art, having a scale indicated at 10', which has the calibration marks 50 below the predetermined temperature of 250°, and has the inclined calibration marks, having ends 11 and 12 disposed on the scale above the predetermined temperature of 250°. The respective ends 11 and 12 of each inclined marker are inclined so that their ends are shown to be 4° apart as compared to the movement of the indicating pointer 52. Thus, the indicating pointer 52 will point to the temperature that is indicated inside the sterilizer, and the setting pointer 53 will be set at a temperature of approximately 4° below the temperature of the indicating member.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

In combination, an autoclave adapted to carry out a processing cycle below a predetermined temperature and a sterilizing cycle above said predetermined temperature,
    control means connected to said autoclave for controlling the temperature therein,
    setting means for setting the temperature at which said autoclave is controlled by said control means,
    a scale on said control means,
    said scale having spaced calibration marks thereon,
    said marks indicating temperature,
    a setting pointer and an indicating pointer,
    said setting pointer adapted to move over one end of said marks and said indicating pointer adapted to move over the other end of said marks,
    the said marks indicating temperatures below said predetermined temperature being generally perpendicular to the path of movement of said pointer,
    said marks above said predetermined temperature being inclined with regard to the path of movement of said pointer,
    the ends of said marks above said predetermined temperature having their ends spaced from each other in a direction parallel to said path of movement of said indicating pointer in an amount equal to a predetermined differential temperature.

No references cited.

LOUIS R. PRINCE, *Primary Examiner.*